United States Patent
Jerebko et al.

(10) Patent No.: US 7,492,968 B2
(45) Date of Patent: Feb. 17, 2009

(54) SYSTEM AND METHOD FOR SEGMENTING A STRUCTURE OF INTEREST USING AN INTERPOLATION OF A SEPARATING SURFACE IN AN AREA OF ATTACHMENT TO A STRUCTURE HAVING SIMILAR PROPERTIES

(75) Inventors: Anna Jerebko, West Chester, PA (US); Luca Bogoni, Philadelphia, PA (US); Sarang Lakare, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 567 days.

(21) Appl. No.: 11/207,318

(22) Filed: Aug. 19, 2005

(65) Prior Publication Data
US 2006/0050991 A1     Mar. 9, 2006

Related U.S. Application Data

(60) Provisional application No. 60/607,565, filed on Sep. 7, 2004.

(51) Int. Cl.
*G06K 9/32* (2006.01)
(52) U.S. Cl. .................................... 382/300
(58) Field of Classification Search ......... 345/606, 345/607; 348/E13.065, E13.066, E7.012; 382/128, 130, 131, 164, 171, 173, 300; 702/169; 708/290
See application file for complete search history.

(56) References Cited

U.S. PATENT DOCUMENTS

| | | | |
|---|---|---|---|
| 6,401,042 B1 * | 6/2002 | Van Riel et al. | 702/17 |
| 6,765,983 B2 * | 7/2004 | Yan et al. | 378/8 |
| 7,136,518 B2 * | 11/2006 | Griffin et al. | 382/133 |
| 2003/0036083 A1 * | 2/2003 | Tamez-Pena et al. | 435/6 |
| 2003/0072479 A1 * | 4/2003 | Totterman et al. | 382/131 |
| 2003/0086599 A1 | 5/2003 | Armato, III et al. | |
| 2004/0114727 A1 * | 6/2004 | Yan et al. | 378/210 |
| 2004/0147830 A1 * | 7/2004 | Parker et al. | 600/407 |
| 2005/0152588 A1 * | 7/2005 | Yoshida et al. | 382/128 |

FOREIGN PATENT DOCUMENTS

WO    WO 2004/081874 A2    9/2004

OTHER PUBLICATIONS

"Computerized detection of colorectal masses in CT colonography based on fuzzy merging and wall-thickening analysis", Nappi et al., Medical Physics, American Institute of Physics, NY, US, vol. 31, No. 4, Apr. 2004, pp. 860-872.
International Search Report including Notification of Transmittal of the International Search Report, International Search Report and Written Opinion of the International Searching Authority, PCT Appln. No. PCT/US2005/031321, mailed Feb. 20, 2006.

* cited by examiner

*Primary Examiner*—Sherali Ishrat

(57) ABSTRACT

A system and method for segmenting a structure of interest are provided. The method comprises: segmenting a surface of the structure of interest; and interpolating a border of the structure of interest, wherein the border separates the structure of interest from other structures having similar properties.

16 Claims, 10 Drawing Sheets

SYSTEM AND METHOD FOR SEGMENTING A STRUCTURE OF INTEREST USING AN INTERPOLATION OF A SEPARATING SURFACE IN AN AREA OF ATTACHMENT TO A STRUCTURE HAVING SIMILAR PROPERTIES

CROSS-REFERENCE TO RELATED APPLICATION

This application claims the benefit of U.S. Provisional Application No. 60/607,565, filed Sep. 7, 2004, a copy of which is herein incorporated by reference in its entirety.

BACKGROUND OF THE INVENTION

1. Technical Field

The present invention relates to image segmentation, and more particularly, to a system and method for segmenting a structure of interest by using an interpolation of a separating surface in an area of attachment to a structure having similar properties.

2. Discussion of the Related Art

Current computer-aided detection and diagnosis (CAD) techniques have been used for the early detection and screening of cancer in areas of the body such as the colon and lungs. For example, CAD techniques such as computed tomography (CT) colonography can locate and identify polyps on the colon wall by using geometric features of the colon surface and/or volumetric properties near the surface to assist with detection. Recently, such techniques have been enhanced to segment polyps to provide the entire voxel set of the polyp. This data can then be used to quantify certain characteristics of the polyp. CAD techniques such as virtual endoscopy based on two-dimensional (2D) and three-dimensional (3D) analysis of image data acquired during diagnostic CT scans can be used locate and identify lung nodules or aneurisms by using geometric features and/or volumetric properties of the lung and its vessel trees. Similar to CT colonoscopy, virtual bronchoscopy and lung nodule detection in chest CT scans includes advanced segmentation methods to provide a medical practitioner with information regarding detected thoracic and lung nodules. This data could then be used to quantify certain characteristics of the nodules and aid in the diagnosis of diseases associated therewith.

In the above-mentioned and other areas of CAD, the surface or boundary between, for example, a segmented polyp and a colon or bronchi lumen or between a lung nodule and the air inside the lungs is relatively easy to determine due to the large intensity discrepancy between these regions. However, the boundaries between polyp tissues of similar intensity are not very obvious. For example, a polyp 110 is always connected to another object having a similar intensity such as a colon fold 120 or colon wall 130 as shown in FIG. 1. Thus, in order to determine the surface or boundary between the polyp 110 and the colon fold 120 or wall 130 special image-processing techniques need to be applied to successfully locate and separate them.

In one image processing technique for polyp segmentation, a hysteresis thresholding is performed that uses some colonic volumetric features. This technique first locates voxels with low curvedness values and high shape indexes and then clusters them to segment the polyp. This technique, however, does not sufficiently identify small polyps and flat polyps since there is an insufficient number of voxels with low curvedness values and high shape indexes for clustering. In another image processing technique, Canny edge detectors are used to locate the polyp-lumen boundary and Radon transformation is used to identify round shaped polyps. This technique, however, does not robustly segment all polyp types.

In yet another image processing technique, a combination of knowledge-guided intensity adjustments, fuzzy c-mean clustering and deformable models is employed for locating the polyp boundary. However, this technique does not robustly segment abnormal growths from healthy tissue. Accordingly, there is a need for a segmentation technique that is capable of robustly segmenting abnormal growths or similar structures from healthy tissue or other nearby structures so that the size and structure of the abnormal growth can be monitored over time and presented to a medical practitioner for analysis.

SUMMARY OF THE INVENTION

The present invention overcomes the foregoing and other problems encountered in the known teachings by providing a system and method for segmenting a structure of interest by using an interpolation of a separating surface in an area of attachment to a structure having similar properties.

In one embodiment of the present invention, a method for segmenting a structure of interest comprises: segmenting a surface of the structure of interest; and interpolating a border of the structure of interest, wherein the border separates the structure of interest from other structures having similar properties. The structure of interest is one of a polyp, lung nodule, bronchi lesion or pulmonary emboli.

When a portion of the border of the structure of interest has no demarcation, the step of interpolating, comprises: transforming a portion of the border of the structure of interest where there is a demarcation into a transformed coordinate space; selecting a coordinate space for interpolation in view of salient properties of the structure of interest; interpolating the portion of the border of the structure of interest where there is no demarcation in the transformed coordinate space; and mapping the interpolated portion of the border of the structure of interest where there is no demarcation back to an original coordinate space of the structure of interest.

The original coordinate space is Cartesian. The surface of the structure of interest is transformed into spherical or ellipsoidal coordinates. The surface of the structure of interest is transformed by using a center mass of the structure of interest as the origin for the transformation.

The step of interpolating comprises: computing a normalization factor to obtain a continuous representation of the surface of the structure of interest in a transformed space; and determining coordinates of voxels in a portion of the border of the structure of interest that has no demarcation by using locations of the voxels surrounding the portion of the border of the structure of interest that has no demarcation in the transformed space.

The structure of interest is acquired by using one of a computed tomography or magnetic resonance imaging technique.

In another method of the present invention, an interpolation method for separating surfaces of an anatomical structure, comprises: segmenting a surface of the anatomical structure; and interpolating a border of the anatomical structure, wherein the border separates the anatomical structure from other structures having similar properties, wherein the step of interpolating the border, comprises: transforming a portion of the border of the anatomical structure where there is a demarcation into a transformed coordinate space; computing a normalization factor to obtain a continuous representation of the surface of the anatomical structure in the transformed space;

and determining coordinates of voxels in a portion of the border of the anatomical structure that has no demarcation by using locations of the voxels surrounding the portion of the border of the anatomical structure that has no demarcation in the transformed space.

The surface of the anatomical structure is transformed into spherical or ellipsoidal coordinates. The surface of the anatomical structure is transformed by using a center mass of the region of interest as the origin for the transformation. The anatomical structure is one of a polyp, lung nodule, bronchi lesion or pulmonary emboli.

In another embodiment of the present invention, a system for segmenting a structure of interest, comprises: a memory device for storing a program; a processor in communication with the memory device, the processor operative with the program to: segment a surface of the structure of interest; and interpolate a border of the structure of interest, wherein the border separates the structure of interest from other structures having similar properties. The structure of interest is one of a polyp, lung nodule, bronchi lesion or pulmonary emboli.

When a portion of the border of the structure of interest has no demarcation, the processor is further operative with the program code when interpolating to: transform a portion of the border of the structure of interest where there is a demarcation into a transformed coordinate space; select a coordinate space for interpolation in view of salient properties of the structure of interest; interpolate the portion of the border of the structure of interest where there is no demarcation in the transformed coordinate space; and map the interpolated portion of the border of the structure of interest where there is no demarcation back to an original coordinate space of the structure of interest.

The original coordinate space is Cartesian. The surface of the structure of interest is transformed into spherical or ellipsoidal coordinates. The surface of the structure of interest is transformed by using a center mass of the structure of interest as the origin for the transformation.

The processor is further operative with the program code during the step of interpolating to: compute a normalization factor to obtain a continuous representation of the surface of the structure of interest in a transformed space; and determine coordinates of voxels in a portion of the border of the structure of interest that has no demarcation by using locations of the voxels surrounding the portion of the border of the structure of interest that has no demarcation in the transformed space.

The structure of interest is acquired by using one of a computed tomography or magnetic resonance imaging device.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 2:
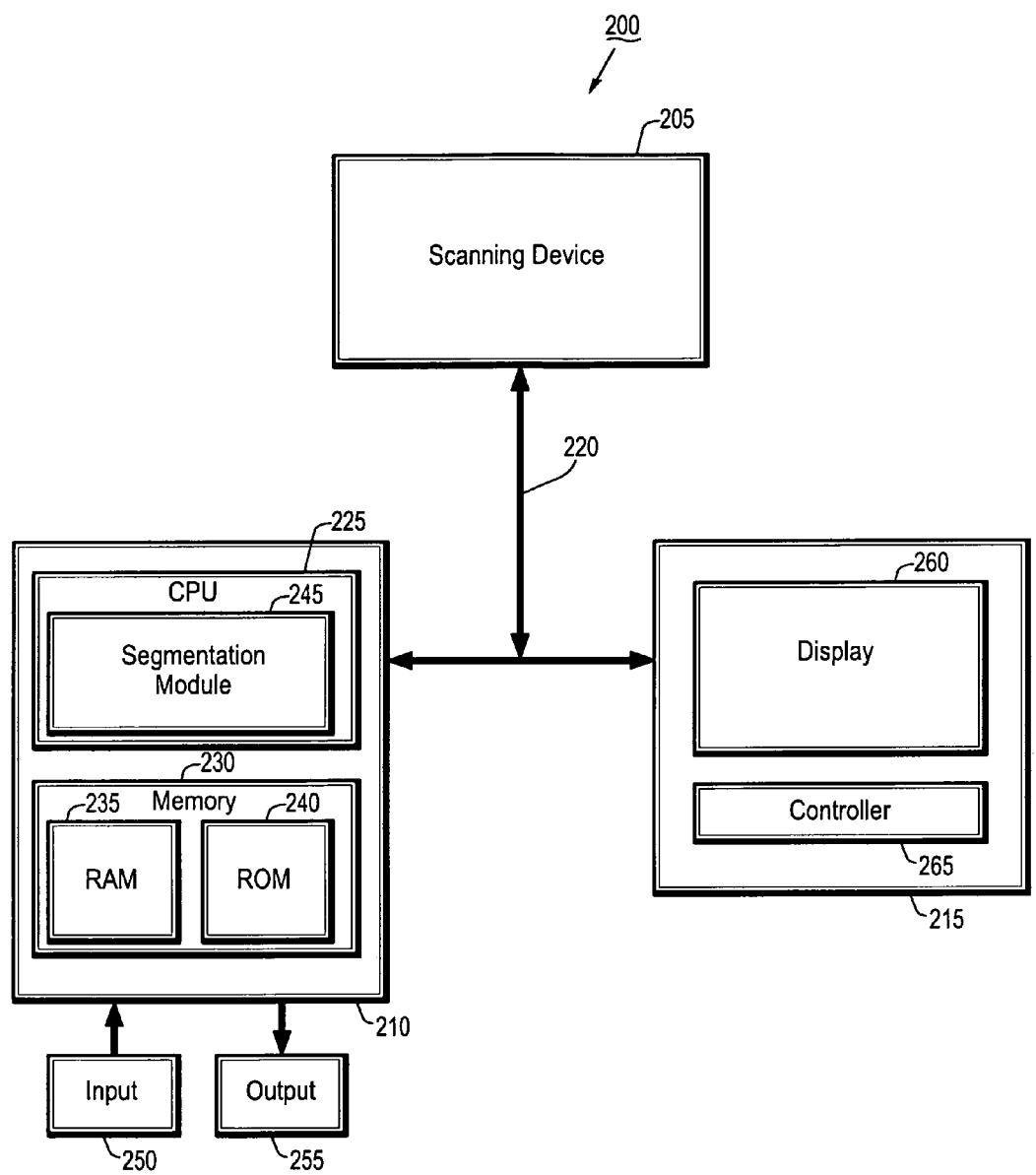
FIG. 2 is a block diagram of a system for segmenting a structure of interest according to an exemplary embodiment of the present invention.

FIG. 2 is a block diagram of a system 200 for segmenting a structure of interest by using an interpolation of a separating surface in an area of attachment to a structure having similar properties according to an exemplary embodiment of the present invention. As shown in FIG. 2, the system 200 includes, inter alia, a scanning device 205, a personal computer (PC) 210 and an operator's console 215 connected over, for example, an Ethernet network 220. The scanning device 205 may be a magnetic resonance (MR) imaging device, a CT imaging device, a helical CT device, a positron emission tomography (PET) device, a 2D or 3D fluoroscopic imaging device, a 2D, 3D, or four-dimensional (4D) ultrasound imaging device, x-ray device or a hybrid-imaging device capable of CT, MR or other imaging techniques.

The PC 210, which may be a portable or laptop computer, a workstation, etc., includes a central processing unit (CPU) 225 and a memory 230, which are connected to an input 250 and an output 255. The CPU 225 includes a segmentation module 245 that includes one or more methods for segmenting a structure of interest by using an interpolation of a separating surface in an area of attachment to a structure having similar properties.

The memory 230 includes a random access memory (RAM) 235 and a read only memory (ROM) 240. The memory 230 can also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The input 250 is constituted by a keyboard, mouse, etc., and the output 255 is constituted by a liquid crystal display (LCD), cathode ray tube (CRT) display, or printer.

The operation of the system 200 is controlled from the operator's console 215, which includes a controller 265, for example, a keyboard, and a display 260, for example, a CRT display. The operator's console 215 communicates with the PC 210 and the scanning device 205 so that 2D image data collected by the scanning device 205 can be rendered into 3D data by the PC 210 and viewed on the display 260. It is to be understood that the PC 210 can be configured to operate and display information provided by the scanning device 205 absent the operator's console 215, using, for example, the input 250 and output 255 devices to execute certain tasks performed by the controller 265 and display 260.

The operator's console 215 further includes any suitable image rendering system/tool/application that can process digital image data of an acquired image dataset (or portion thereof) to generate and display 2D, 3D or N-dimensional (ND) (where N is an integer greater than 3) images on the display 260. More specifically, the image rendering system may be an application that provides 2D/3D/ND rendering and visualization of medical image data, and which executes on a general purpose or specific computer workstation. For example, the image rendering system may enable a user to navigate through a 3D image or a plurality of 2D image slices. The PC 210 may also include an image rendering system/tool/application for processing digital image data of an acquired image dataset to generate and display 2D, 3D or ND images.

As shown in FIG. 2, the segmentation module 245 may also be used by the PC 210 to receive and process digital medical image data, which as noted above, may be in the form of raw image data, 2D reconstructed data (e.g., axial slices), 3D or ND reconstructed data such as volumetric image data or multiplanar reformats, or any combination of such formats. The data processing results can be output from the PC 210 via the network 220 to an image rendering system in the operator's console 215 for generating 2D, 3D or ND renderings of image data in accordance with the data processing results, such as segmentation of organs or anatomical structures, color or intensity variations, and so forth.

Figure 3:
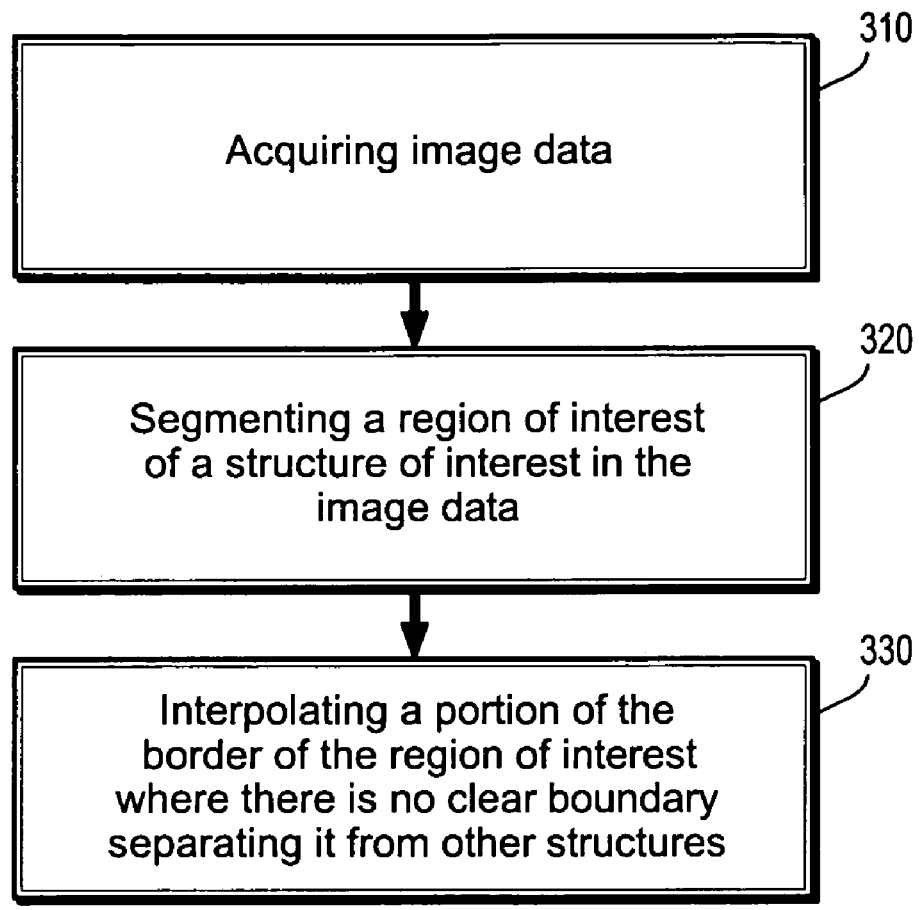
FIG. 3 is a flowchart illustrating a method for segmenting a structure of interest according to an exemplary embodiment of the present invention.

FIG. 3 is a flowchart showing an operation of a method for segmenting a structure of interest by using an interpolation of a separating surface in an area of attachment to a structure having similar properties according to an exemplary embodiment of the present invention.

Figure 1:
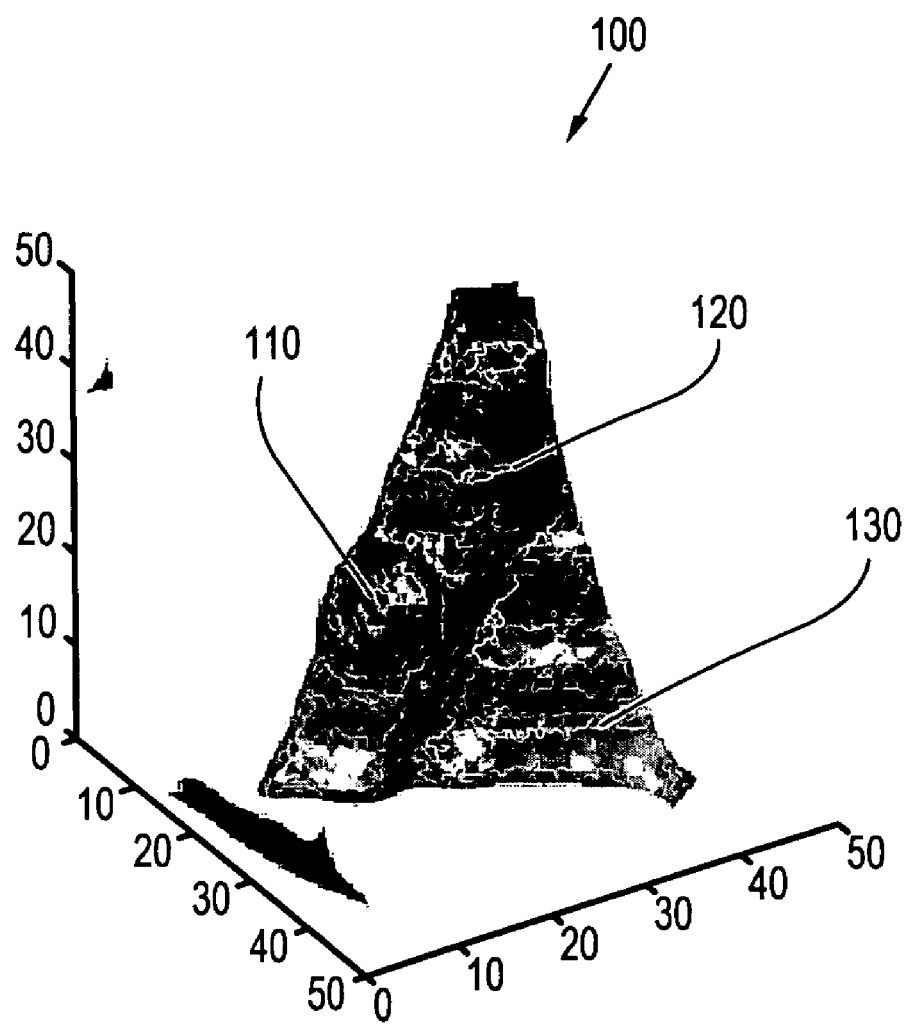
FIG. 1 is an image of a portion of a colon wall with a protruding polypoid lesion.

As shown in FIG. 3, image data is acquired from, for example, a colon inside a patient (310). This is accomplished by using the scanning device 205, in this example a CT scanner, which is operated at the operator's console 215, to scan the patient's abdomen thereby generating a series of 2D image slices associated with the colon. The 2D image slices of the colon are then combined to form a 3D image 100 as shown, for example, in FIG. 1. It is to be understood that the image data could be acquired to observe a variety of organs or blood vessels within a patient. For example, the image data could be acquired by taking x-rays of a patient's lung or by taking a CT scan of a patient's leg or entire body. It should also be understood that the image data could be non-medical image data acquired from, for example, non-anatomical structures. Further, the 2D image slices may be combined to form an ND image for analysis in accordance with the present invention.

After the image data is acquired, a region or structure of interest such as polyp in the colon is segmented (320). The well defined surface of the region of interest is segmented using, for example, a Canny edge detection technique. A variety of segmentation techniques such as snakes or deformable models can be used in this step. Once the surface of the region of interest has been segmented, a portion of the region of interest where there is no clear demarcation of a border separating it from other parts of the colon is segmented by performing an interpolation according to an exemplary embodiment of the present invention (330). The interpolating process is discussed hereinafter with reference to FIG. 4.

Figure 4:
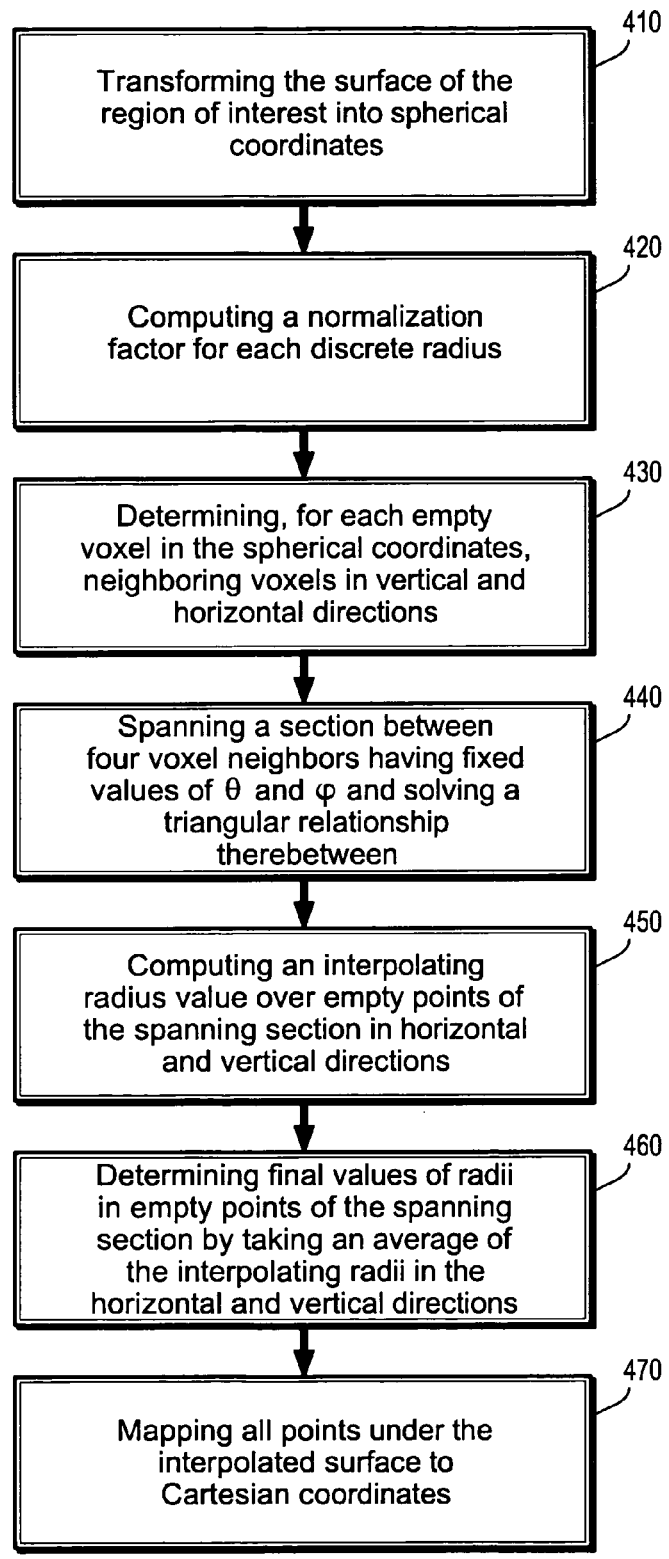
FIG. 4 is a flowchart illustrating an interpolating method for segmenting a structure of interest according to an exemplary embodiment of the present invention.

FIG. 4 is a flowchart illustrating a method for interpolating a separating surface in an area of attachment to a structure having similar properties according to an exemplary embodiment of the present invention. It is to be understood that the local structure has properties such that it is similar to that of, for example, a polyp or lung nodule coupled thereto, thus resulting in no clear demarcation of a border therebetween. As shown in FIG. 4, a spherical coordinate transformation is performed on a region of interest such as a polyp (410). This is accomplished by transforming the surface of the polyp to spherical coordinates by using the center mass of the polyp surface as the origin for the transformation. The new coordinates $r$ ($\phi$, $\theta$) of every point (x, y, z) on the 3D image of the separating surface or edge are calculated as follows:

$$r = \sqrt{x^2 + y^2 + z^2};$$

$$\text{where, } \varphi = \tan^{-1}\left(\frac{y}{x}\right); \text{ and}$$

$$\theta = \cos^{-1}\left(\frac{z}{r}\right).$$

Figure 5A:
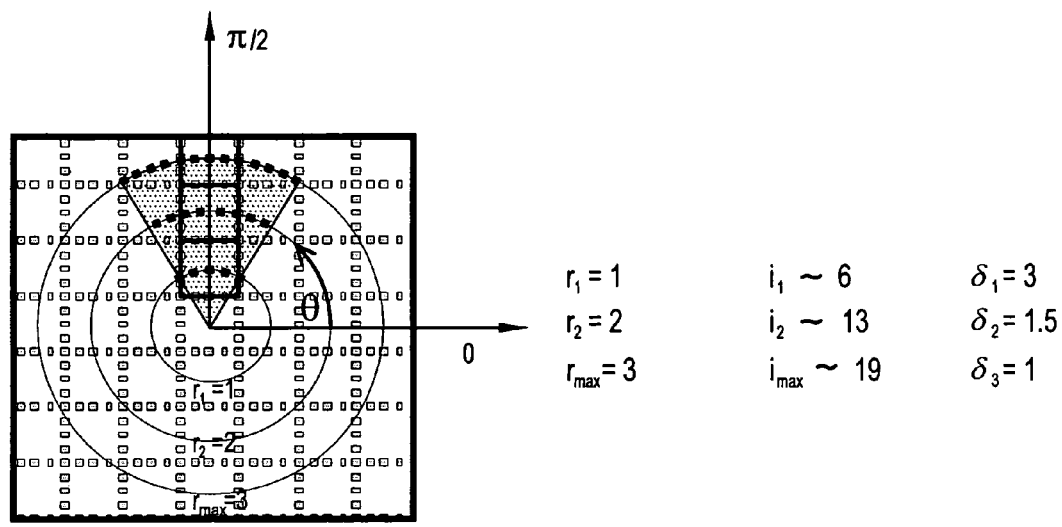
FIG. 5 is a pair of graphs illustrating the calculation of a normalization factor according to an exemplary embodiment of the present invention.
Figure 5B:
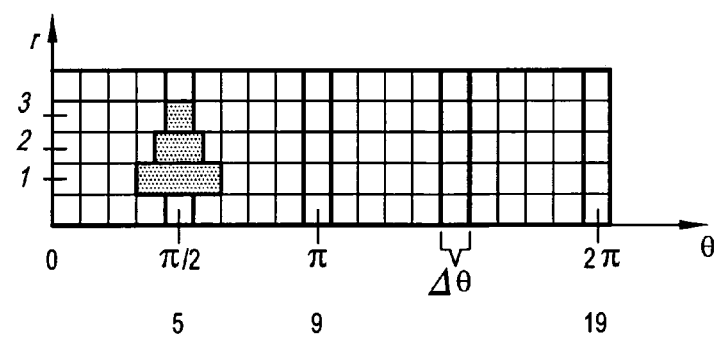

After transforming the surface of the polyp into spherical coordinates, a normalization or stretching factor is computed for each discrete radius r (420). The normalization factor allows portions of the surface, which are at varying distances from the centroid of the spherical transformation, to have a uniform representation in a spherical space. The stretching factor is computed as shown in FIG. 5. For example, the normalization factor (e.g., $\delta(r)$) is calculated as follows:

$$\delta(r) = r_{max}/r,$$

where the discretization degree is, $$D = \text{round}(2\pi r_{max}),$$

then each boundary voxel (x, y, z) maps into $\delta(r)$ voxels in spherical coordinates occupying the space of a solid angle [$\phi - \Delta\phi^*\delta(r)/2$, $\phi + \Delta\phi^* \delta(r)/2$], [$\theta - \Delta\theta^*\delta(r)/2$, $\theta + \Delta\theta^*\delta(r)/2$], where $\phi$ and $\theta$ increments are calculated as follows:

$$\Delta\varphi = \frac{2\pi}{D}; \quad \Delta\theta = \frac{2\pi}{D}.$$

Figure 7:
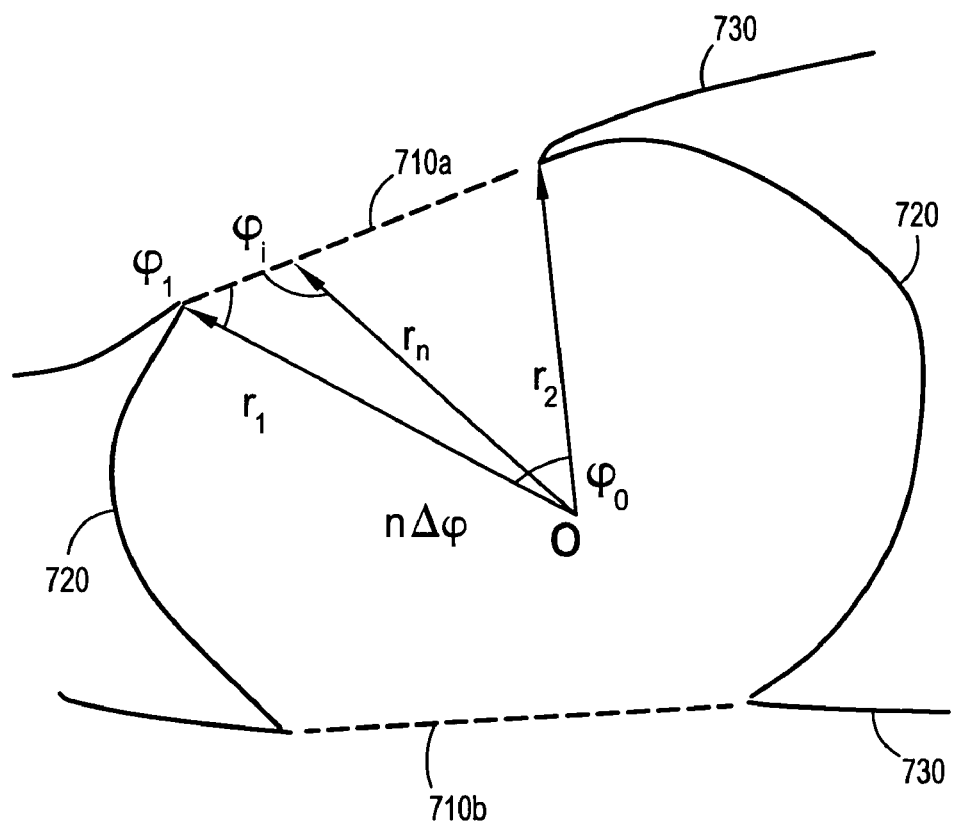
FIG. 7 is a sketch illustrating a separating surface for interpolation according to an exemplary embodiment of the present invention.

In order to extract the polyp from nearby healthy tissue the location and shape of the surface that separates the portion of the region of interest from nearby or surrounding areas is estimated. As shown in FIG. 7, a gap represented by dashed lines 710a, b of an image r ($\phi$, $\theta$) corresponds to the base of a polyp 720 that separates the polyp 720 from nearby or surrounding structures such as a colon wall 730. For the base of the polyp 710a, b to be interpolated, the edges of the image r ($\phi$, $\theta$) are assumed to be connected such that: r ($\phi$, $\theta + 2\pi$) = r($\phi$, $\theta$) and r ($\theta + \pi$, $\theta$) = r($\phi$, $\theta$).

Figure 6A:
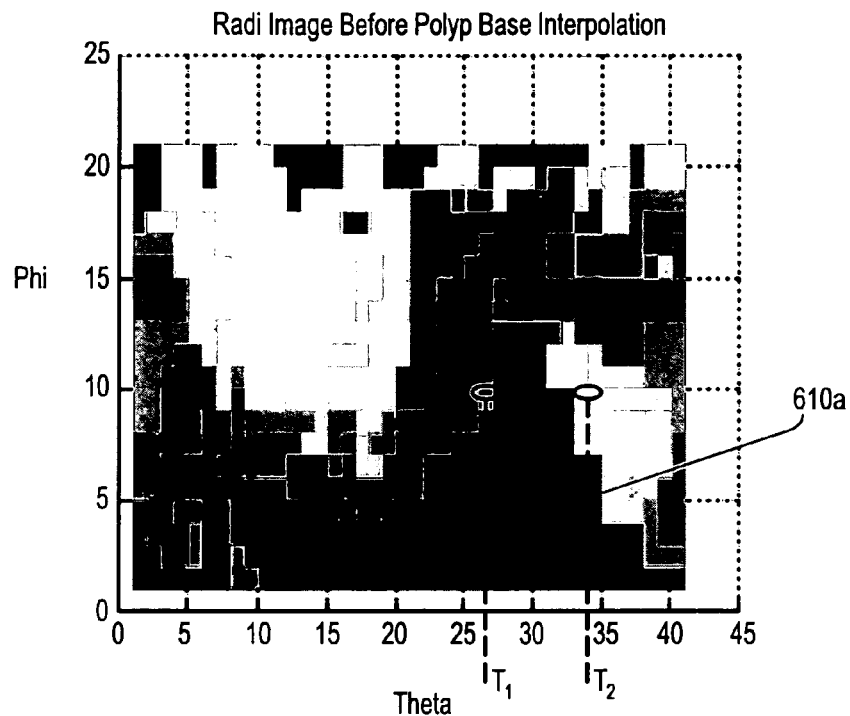
FIG. 6 is a pair of graphs illustrating the transformation of a polyp surface to spherical coordinates according to an exemplary embodiment of the present invention.
Figure 6B:
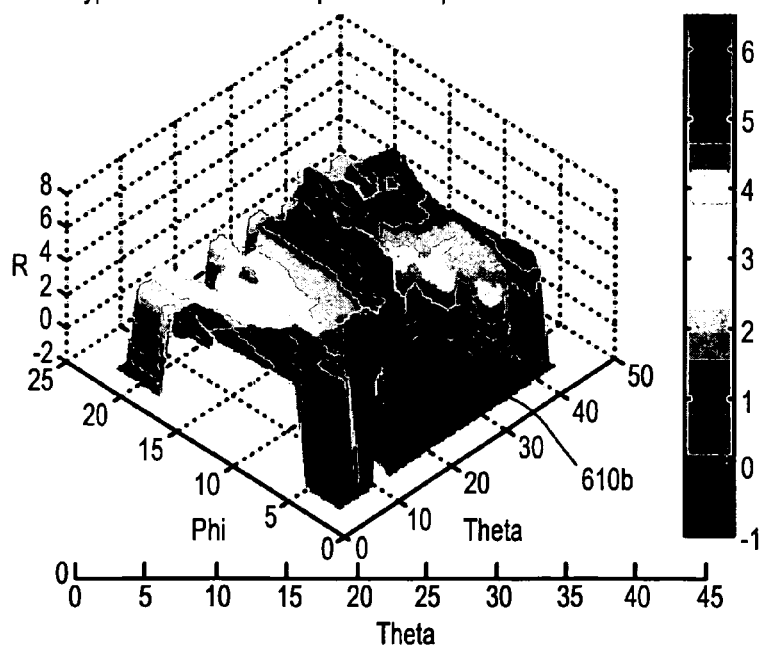

For each empty voxel in the spherical coordinates, neighboring voxels in the vertical and horizontal directions are determined (430). For example, for each empty voxel, two of its closest neighbors are determined from existing surface patches, first in the vertical ($\phi$) and then in the horizontal ($\theta$) directions. FIG. 6 illustrates a scenario where for a fixed value $\phi$, two corresponding angles $T_1$ and $T_2$ are shown as closest neighbors across a region that has no previously computed surface. It is to be understood that empty voxels are indicated, for example, in Cartesian coordinates by the dashed lines 710a, b in FIG. 7 and in the spherical coordinates by darker regions 610a, b in FIG. 6.

Next, a section for interpolating between neighbors is determined (440). In other words, two sections between, for example, four voxel neighbors having fixed values of $\theta$ and $\phi$ are determined and triangular relationships between each pair of neighbors, the center of coordinates and radius of the point being interpolated are determined. As shown in FIG. 7, two of the four voxel neighbors indicated by the tips of the arrows projecting from the center point O, which is the center of the coordinates, form a triangle where two sides (e.g., radii $r_1$ and $r_2$) and the angle between them $\phi_0$ are known.

After determining the section, e.g., 710a, b, for interpolating and solving the above-mentioned triangular relationships, the interpolation along both the vertical and horizontal directions for each empty point, indicated by the dashed line 710a, b, in the spherical coordinate system is computed (450). In other words, all points lying along the dashed line segment 710a connecting the two voxel neighbors having endpoints of radii $r_1$ and $r_2$ are interpolated. The interpolation can then be performed by spanning the angle $\phi_0$ by the increments $\Delta\phi$. From this, each interpolating radius value spanning the linear segment can be computed. The interpolated linear segment in spherical space will span an arc in Cartesian space.

Figure 8A:
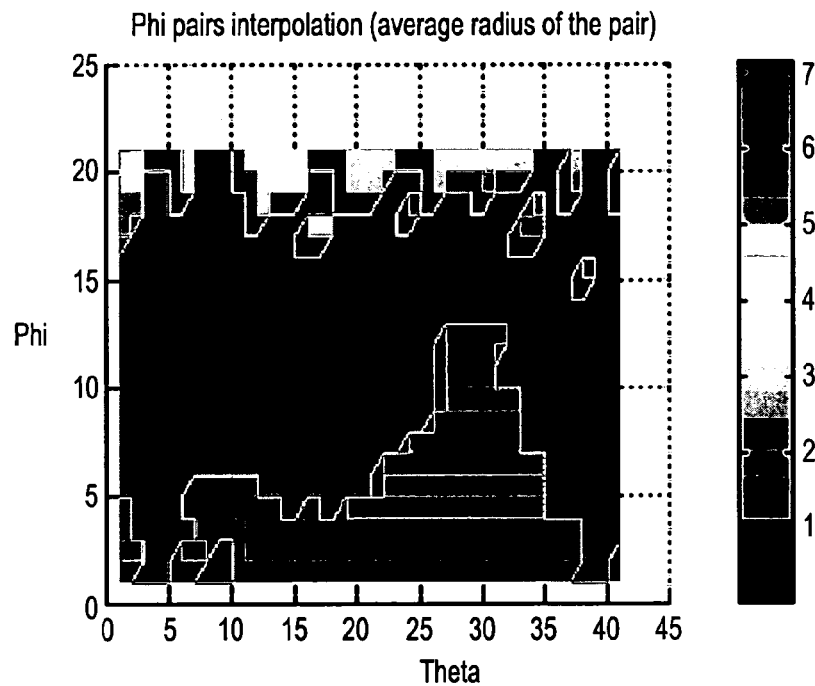
FIG. 8 is a pair of graphs illustrating results of applying an interpolated separating surface to a mapping of FIG. 6.
Figure 8B:
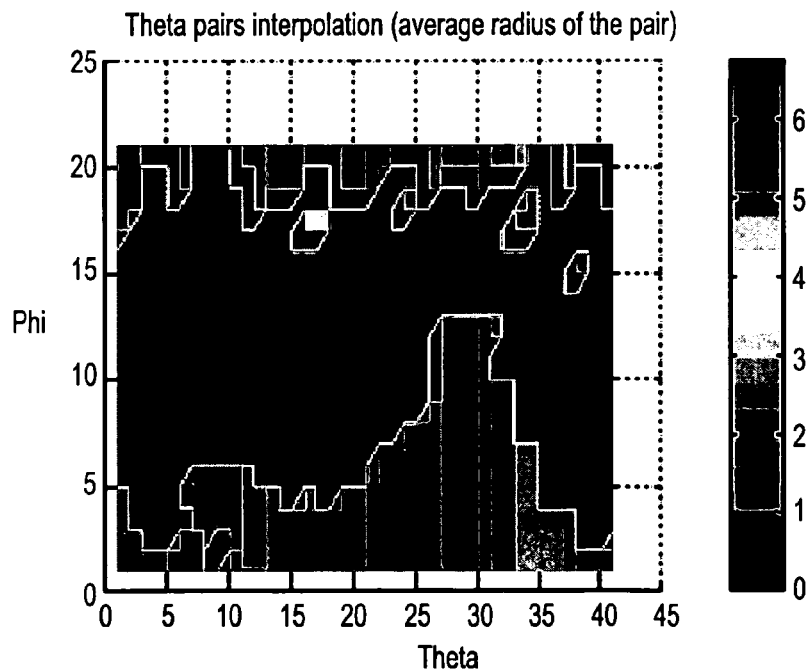
Figure 9A:
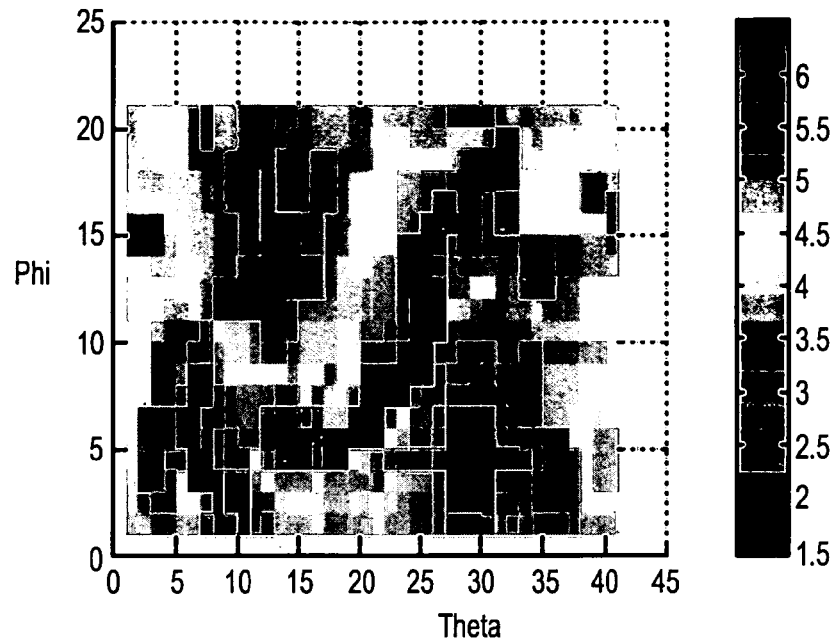
FIG. 9 is a pair of graphs illustrating interpolation results in spherical coordinates according to an exemplary embodiment of the present invention.
Figure 9B:
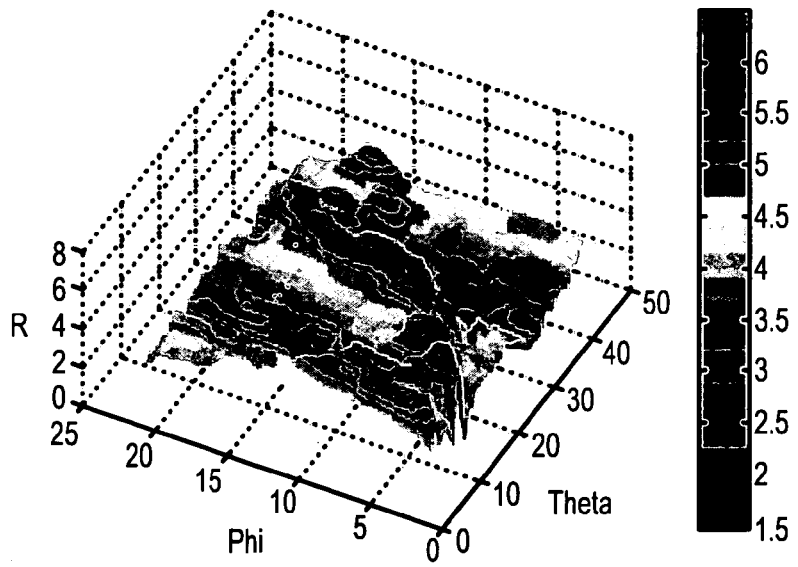

Images (a) and (b) of FIG. 8 illustrate the results of applying the interpolation procedure to the mapping shown in FIG. 6 separately for $\phi$ and $\theta$ pairs. Images (a) and (b) of FIG. 9 illustrate the interpolation results for the polyp base and surface gaps in the spherical coordinates obtained as the average of the radius values obtained by solving the $\phi$ and $\theta$ triangle depicted in images (a) and (b) of FIG. 8.

Once the interpolation has been performed, the interpolating results are integrated (460). This is accomplished by determining final values of radii in empty points of the spanning section by taking an average of the interpolating radii in the vertical and horizontal directions. It is to be understood that straight lines in Cartesian space become concave arcs in spherical space as illustrated by the results of the combination of values shown in images (a) and (b) of FIG. 9. It should also be understood that while the average is being used as a means to interpolate the radius, this could be performed by using a function other than the average to determine a radial contribution, thus enabling different types of interpolating surfaces to be obtained.

Figure 10:
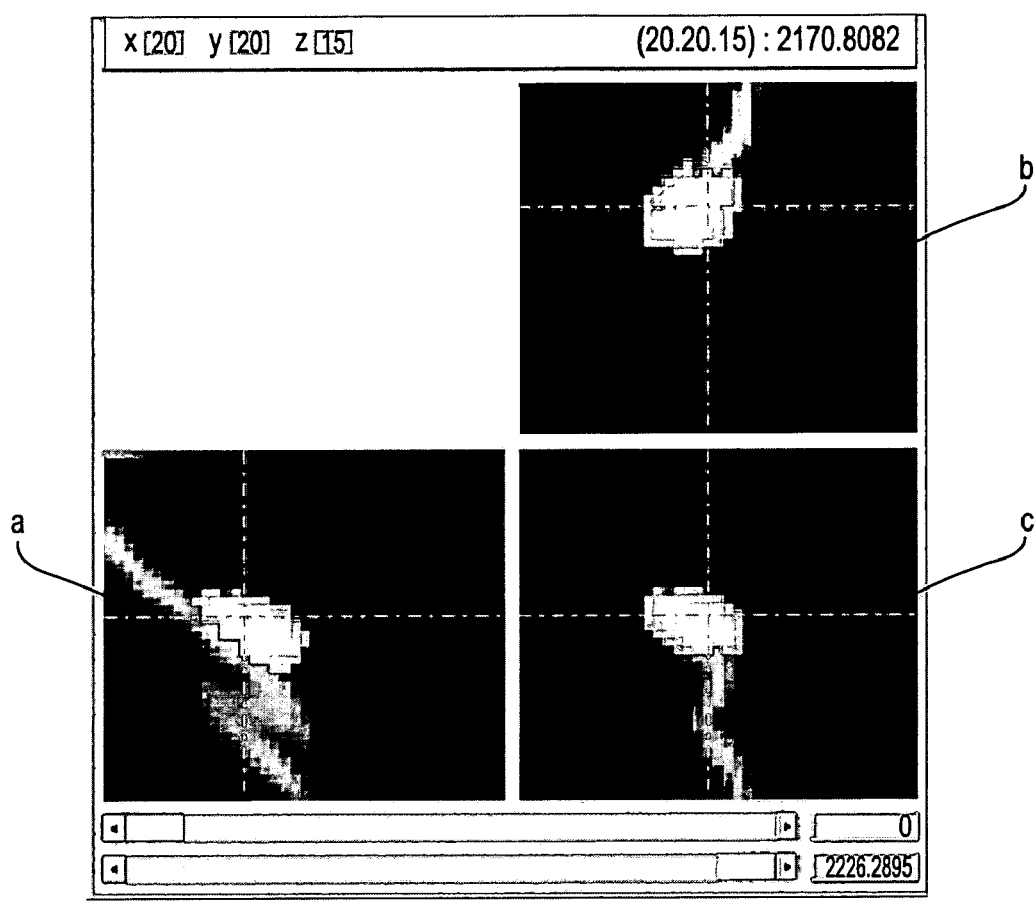
FIG. 10 is a graphical interface illustrating interpolation results mapped to Cartesian coordinates according to an exemplary embodiment of the present invention.

Upon integrating the interpolated results and filling all the gaps in the polyp surface, all points under the interpolated surface are mapped back to Cartesian coordinates (470). An example of this is illustrated in FIG. 10. Images (a), (b) and (c) of FIG. 10 illustrate three orthogonal views of the same polyp surface shown in FIG. 1 with the segmentation results highlighted.

In accordance with an exemplary embodiment of the present invention, a structure of interest can be segmented by interpolating a separating surface in an area of attachment to a local structure having similar properties. This technique can be implemented as an extension or alternative to CAD methods such as virtual colonoscopy or bronchoscopy or other automated polyp, lung nodule or aneurism visualization and detection methods. Thus, enabling a medical practitioner to automatically obtain accurate lesion size measurements and discriminate between a lesion and other anatomical structures such as healthy tissue, stool and streak artifacts. Further, this technique could be used alone or in combination with CAD methods to obtain additional discriminative features for characterization of abnormal lesions or as inputs for classification procedures.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for segmenting a structure of interest, comprising:
   segmenting a surface of a body region that includes the structure of interest, wherein the segmentation shows an incomplete border between the structure of interest and tissue surrounding the structure of interest; and
   interpolating missing parts of the incomplete border so that a complete border between the structure of interest and the surrounding tissue can be realized.

2. The method of claim 1, wherein the structure of interest is one of a polyp, lung nodule, bronchi lesion or pulmonary emboli.

3. The method of claim 1, wherein the step of interpolating, comprises:
   transforming the surface of the structure of interest into a transformed coordinate space;
   computing a normalization factor for each radius in the transformed coordinate space;
   determining, for each empty voxels in the transformed coordinate space, neighboring voxels in vertical and horizontal directions;
   spanning a section between four voxel neighbors and solving a triangular relationship therebetween;
   computing an interpolating radius value over empty points of the spanning section in the horizontal and vertical directions;
   determining final interpolated radii values of the empty points of the spanning section by taking an average of the computed interpolating radii in the horizontal and vertical directions; and mapping the final interpolated radii values back to an original coordinate space of the structure of interest.

4. The method of claim 3, wherein the original coordinate space is Cartesian.

5. The method of claim 3, wherein the surface of the structure of interest is transformed into spherical or ellipsoidal coordinates.

6. The method of claim 3, wherein the surface of the structure of interest is transformed by using a center mass of the structure of interest as the origin for the transformation.

7. The method of claim 1, wherein the structure of interest is acquired by using one of a computed tomography or magnetic resonance imaging technique.

8. A system for segmenting a structure of interest, comprising:
   a memory device for storing a program;
   a processor in communication with the memory device, the processor operative with the program to:
   segment a surface of a body region that includes the structure of interest, wherein the segmentation shows an incomplete border between the structure of interest and tissue surrounding the structure of interest; and
   interpolate missing parts of the incomplete border so that a complete border between the structure of interest and the surrounding tissue can be realized.

9. The system of claim 8, wherein the structure of interest is one of a polyp, lung nodule, bronchi lesion or pulmonary emboli.

10. The system of claim 8, wherein the processor is further operative with the program code when interpolating to:
   transform the surface of the structure of interest into a transformed coordinate space;
   compute a normalization factor for each radius in the transformed coordinate space;
   determine, for each empty voxel in the transformed coordinate space, neighboring voxels in vertical and horizontal directions;
   span a section between four voxel neighbors and solve a triangular relationship therebetween;
   compute an interpolating radius value over empty points of the spanning section in the horizontal and vertical directions;
   determine final interpolated radii values of the empty points of the spanning section by taking an average of the computed interpolating radii in the horizontal and vertical directions; and
   map the final interpolated radii values back to an original coordinate space of the structure of interest.

11. The system of claim 10, wherein the original coordinate space is Cartesian.

12. The system of claim 10, wherein the surface of the structure of interest is transformed into spherical or ellipsoidal coordinates.

13. The system of claim 10, wherein the surface of the structure of interest is transformed by using a center mass of the structure of interest as the origin for the transformation.

14. The system of claim 8, wherein the structure of interest is acquired by one of a computed tomography or magnetic resonance imaging device.

15. A computer readable medium tangibly embodying a program of instructions executable by a processor to perform method steps for segmenting a structure of interest, the method steps comprising:
   segmenting a surface of a body region that includes the structure of interest, wherein the segmentation shows an incomplete border between the structure of interest and tissue surrounding the structure of interest; and
   interpolating missing parts of the incomplete border so that a complete border between the structure of interest and the surrounding tissue can be realized.

16. The computer readable medium of claim 15, wherein the step of interpolating, comprises:
   transforming the surface of the structure of interest into a transformed coordinate space;
   computing a normalization factor for each radius in the transformed coordinate space;
   determining, for each empty voxel in the transformed coordinate space, neighboring voxels in vertical and horizontal directions;
   spanning a section between four voxel neighbors and solving a triangular relationship therebetween;
   computing an interpolating radius value over empty points of the spanning section in the horizontal and vertical directions;
   determining final interpolated radii values of the empty points of the spanning section by taking an average of the computed interpolating radii in the horizontal and vertical directions; and
   mapping the final interpolated radii values back to an original coordinate space of the structure of interest.

* * * * *